United States Patent
Gerlach

(10) Patent No.: US 7,961,590 B2
(45) Date of Patent: Jun. 14, 2011

(54) METHOD FOR OFDM DATA TRANSMISSION IN A SINGLE-FREQUENCY MULTI-CELL MOBILE NETWORK WITH CHANNEL ESTIMATION BY MEANS OF PILOTS SUBGRID, A BASE TRANSCEIVER STATION, A BASE STATION CONTROLLER, A MOBILE TERMINAL AND A MOBILE NETWORK THEREFOR

(75) Inventor: Christian Georg Gerlach, Ditzingen (DE)

(73) Assignee: Alcatel Lucent, Paris (FR)

( * ) Notice: Subject to any disclaimer, the term of this patent is extended or adjusted under 35 U.S.C. 154(b) by 1352 days.

(21) Appl. No.: 11/356,166

(22) Filed: Feb. 17, 2006

(65) Prior Publication Data
US 2006/0198294 A1    Sep. 7, 2006

(30) Foreign Application Priority Data

Mar. 1, 2005 (EP) .................................... 05290465

(51) Int. Cl.
*H04J 11/00* (2006.01)
(52) U.S. Cl. ......... 370/208; 370/203; 375/259; 375/260
(58) Field of Classification Search .................. 370/203, 370/208, 310, 345; 375/316, 346, 347, 259–260; 455/403, 422.1, 450
See application file for complete search history.

(56) References Cited

U.S. PATENT DOCUMENTS

| | | | | |
|---|---|---|---|---|
| 6,954,481 B1 * | 10/2005 | Laroia et al. | ................... | 375/132 |
| 6,961,364 B1 * | 11/2005 | Laroia et al. | ................... | 375/132 |
| 7,085,583 B2 * | 8/2006 | Ozluturk et al. | ............... | 455/522 |
| 2001/0055293 A1 * | 12/2001 | Parsa et al. | ...................... | 370/342 |
| 2003/0103445 A1 * | 6/2003 | Steer et al. | ..................... | 370/208 |
| 2004/0131007 A1 * | 7/2004 | Smee et al. | ................... | 370/208 |
| 2004/0190640 A1 | 9/2004 | Dubuc et al. | | |
| 2005/0073971 A1 * | 4/2005 | Mukai | ............................ | 370/328 |
| 2005/0141475 A1 * | 6/2005 | Vijayan et al. | ................ | 370/345 |
| 2007/0133386 A1 * | 6/2007 | Kim et al. | ..................... | 370/203 |

OTHER PUBLICATIONS

Wikipedia, "Single-Frequency Network," Online at http://en.wikipedia.org/wiki/Single-frequency_network, Last Retrieved: Jan. 31, 2011.
Wolfgang Zirwas, et al. "Synchronization of Single Frequency Networks.", Sep. 2001.

(Continued)

*Primary Examiner* — William Trost
*Assistant Examiner* — Charles C Jiang
(74) *Attorney, Agent, or Firm* — Fay Sharpe LLP

(57) ABSTRACT

The invention concerns a method for OFDM data transmission in a single-frequency multi-cell mobile network from and to mobile terminals (MT) with channel estimation by means of pilots (PILOT) of a pilot subgrid in an OFDM time-frequency grid, whereby the positions of the pilot subgrids of different cells of the mobile network are randomly or pseudo-randomly distributed, a base transceiver station, a base station controller, a mobile terminal and a mobile network therefor.

10 Claims, 2 Drawing Sheets

OTHER PUBLICATIONS

3GPP: "OFDM With Interference Control for Improved HSDPA Coverage," 3GPP TSG RAN WGI Meeting #37, May 2004, pp. 1-11, XP002310556.

Raul Gonzalez, et al. "Analysis of the Behaviour of Different 2D Interpolation Techniques Using an Adaptive-Pilot Symbol Aided OFDM Wireless Systems," Mobile Future, 2004 and the Symposium on Trends in Communications. Sympotic '04. Joint 1st Workshop on Bratislava, Slovakia, Oct. 24-26, 2004, Piscataway, CA, USA, IEEE, US, Oct. 24, 2004, pp. 43-46.

3GPP: "3rd Generation Partnership Project; Technical Specification Group Radio Access Network; Feasibility Study for Orthogonal Frequency Division Multiplexing (OFDM) for Utran Enhancement (Release 6)" TR 25.892 V6. 0.0, Jun. 1, 2004, XP002358830.

* cited by examiner

METHOD FOR OFDM DATA TRANSMISSION IN A SINGLE-FREQUENCY MULTI-CELL MOBILE NETWORK WITH CHANNEL ESTIMATION BY MEANS OF PILOTS SUBGRID, A BASE TRANSCEIVER STATION, A BASE STATION CONTROLLER, A MOBILE TERMINAL AND A MOBILE NETWORK THEREFOR

The invention is based on a priority application EP 05290465.3 which is hereby incorporated by reference.

FIELD OF THE INVENTION

The invention relates to a method for OFDM (OFDM=Orthogonal Frequency Division Multiplexing) data transmission in a single-frequency multi-cell mobile network with channel estimation by means of pilots of a pilot subgrid in an OFDM time-frequency grid, wherein the positions of the pilot subgrids of different cells of the mobile network are randomly or pseudo-randomly distributed, a base transceiver station comprising means for data transmission in a single-frequency multi-cell mobile network from and to mobile terminals with channel estimation by means of pilots of a pilot subgrid in an OFDM time-frequency grid, wherein the positions of the pilot subgrids of different cells of the mobile network are randomly or pseudo-randomly distributed, a base station controller for radio resource management in a single-frequency multi-cell mobile network, wherein the base station controller comprises means for allocating pilot subgrids to cells of the mobile network with randomly or pseudo-randomly distributed positions of these pilot subgrids in an OFDM time-frequency grid of the mobile network, a mobile terminal for OFDM data transmission in a single-frequency multi-cell mobile network, wherein the mobile terminal comprises means for receiving information about the pseudo-random position of the pilot subgrid and means for evaluating said information in order to determine said position and a mobile network comprising mobile terminals, at least one base transceiver station comprising means for data transmission in a single-frequency multi-cell mobile network from and to mobile terminals with channel estimation by means of pilots of a pilot subgrid in an OFDM time-frequency grid, wherein the positions of the pilot subgrids of different cells of the mobile network are randomly or pseudo-randomly distributed and at least one base station controller for radio resource management in a single-frequency multi-cell mobile network, wherein the base station controller comprises means for allocating pilot subgrids to cells of the mobile network with randomly or pseudo-randomly distributed positions of these pilot subgrids in an OFDM time-frequency grid of the mobile network.

BACKGROUND OF THE INVENTION

OFDM air interfaces will become increasingly important e.g. for future evolutions of air interfaces in 3GPP Radio Access Networks, for Wireless Local Area Networks (WLANs) e.g. according to the IEEE 802.11a standard or for a $4^{th}$ generation air interface.

In OFDM transmission, time-frequency patterns are allocated to the mobile terminals. Different cells can have different time-frequency patterns, so that no interference coordination between the cells is necessary or possible.

Given the licensed bandwidth, transmission capacity from network providers e.g. for WEB surfing or video streaming has to be as high as possible for all users to serve as many subscribers as possible. Further the quality of service experienced by the user and the coverage of the service is an important property demanded by the user. So OFDM shall also work at the cell border.

A frequency re-use factor of 1 for the different cells shall be achieved for OFDM transmission in order to increase the utilization of the bandwidth without degradation of the quality of service caused by inter-cell interference.

In cellular systems with a frequency re-use factor of 1 the signal to interference ratio at the cell border approaches the factor 1 or 0 dB, so that no useful transmission from the base station to the mobile terminal can be kept up. Therefore in CDMA systems (CDMA=Code Division Multiple Access) soft handover was introduced using a different code from the neighboring cell in addition to the primary code from the serving cell. Additionally both base stations use a differently scrambled pilot signal. For packet transmission using High Speed Downlink Packet Access (HSDPA) no such solution is given reducing the coverage of HSDPA transmission to a fraction of the cell area.

In OFDM transmission, time-frequency patterns are allocated to a mobile terminal instead of codes in CDMA systems. In OFDM transmission, in contrast to CDMA transmission, interference can be planned and avoided. For OFDM transmission, which does not provide different scrambling codes for the different base stations, the problem at the cell border has to be solved as well. For that purpose time-frequency or frequency patterns are allocated to the users and the caused cross-cell interference can be coordinated.

For the coordination of interferences, the frequency patterns have to be the same in neighbor cells while the pilot subgrid in neighbor cells shall be different to allow channel estimation.

Generally to enable channel estimation in the interference region of two cells, it is assumed that pilots and signaling symbols have higher energy than the data symbols, which allows channel estimation even if the pilot of the serving cell falls on the same subcarrier frequency as the data symbol of the interfering cell.

But as a consequence it is necessary that the pilots of the interfering cells do not fall on the same subcarrier frequency. So it is necessary, that the pilot subgrids in neighbor cells shall be different.

The object of the invention is to propose a method for OFDM data transmission in a single-frequency multi-cell mobile network with frequency re-use and channel estimation by means of pilots of a pilot subgrid and without the need for a cell planning for the pilots.

SUMMARY OF THE INVENTION

This object is achieved by a method according to the teaching of claim 1, a base transceiver station according to the teaching of claim 4, a base station controller according to the teaching of claim 7, a mobile terminal according to the teaching of claim 9 and a mobile network according to the teaching of claim 10.

The main idea of the invention is, that the position of the pilot subgrid in the OFDM time-frequency grid is given by random or pseudo-random sequences for each cell.

Since the (pseudo-)random position of the pilot subgrid shall be different for each neighbor cell, the (pseudo-)random sequences should be either cell specific or time shifted for each cell.

Assumed the pilot subcarrier frequency distance is p, there are p-1 frequency shifts of the pilot subgrid possible that do not collide with the pilot subgrid of a neighbor cell. The idea is then, that for unsynchronized cells the probability of a collision is as low as approximately 1/p.

Further, it can be tolerated if one collision occurs in an OFDM symbol, which represents the manifold of all subcarrier frequencies in the OFDM symbol period, if in the OFDM symbol before and after no collision happens. Then the channel estimation can be extrapolated or interpolated from the adjacent OFDM symbols.

Now the probability that two collisions occur one after the other is so low that the block error rate is only insignificantly raised by these events. Since a block error can never be ruled out, there is no principle problem with this technique.

Further developments of the invention can be gathered from the dependent claims and the following description.

BRIEF DESCRIPTION OF THE DRAWINGS

In the following the invention will be explained further making reference to the attached drawings.

DETAILED DESCRIPTION OF THE INVENTION

A mobile network according to the invention comprises mobile terminals, at least one base transceiver station according to the invention and at least one base station controller according to the invention.

Each of said mobile terminals is connected to one of said at least one base transceiver stations, and each of said at least one base transceiver stations is in turn connected to one of said at least one base station controller.

The mobile terminals comprise the functionality of a mobile terminal for OFDM transmission in a mobile network, i.e. they can be connected to a mobile network by means of a base transceiver station.

In a preferred embodiment, the mobile terminals comprise means for receiving information about the pseudo-random position of the pilot subgrid and means for evaluating said information in order to determine said position.

A base transceiver station according to the invention comprises the functionality of a base transceiver station of a mobile network, i.e. it provides the possibility for mobile terminals to get connected to the mobile network. Furthermore, the base transceiver station comprises means for data transmission in a single-frequency multi-cell mobile network from and to mobile terminals with channel estimation by means of pilots of a pilot subgrid and with the positions of the pilot subgrids in the OFDM time-frequency grid of different cells of the mobile network being randomly or pseudo-randomly distributed.

In a preferred embodiment, the base transceiver station comprises means for signaling to the mobile terminals information about the pseudo-random position of the pilot subgrid.

A base station controller according to the invention comprises the functionality of a base station controller of a mobile network, i.e. it controls the radio resources and performs handover procedures. Furthermore, the base station controller comprises means for allocating pilot subgrids to cells of the mobile network with randomly or pseudo-randomly distributed positions of these pilot subgrids in an OFDM time-frequency grid.

Figure 3:
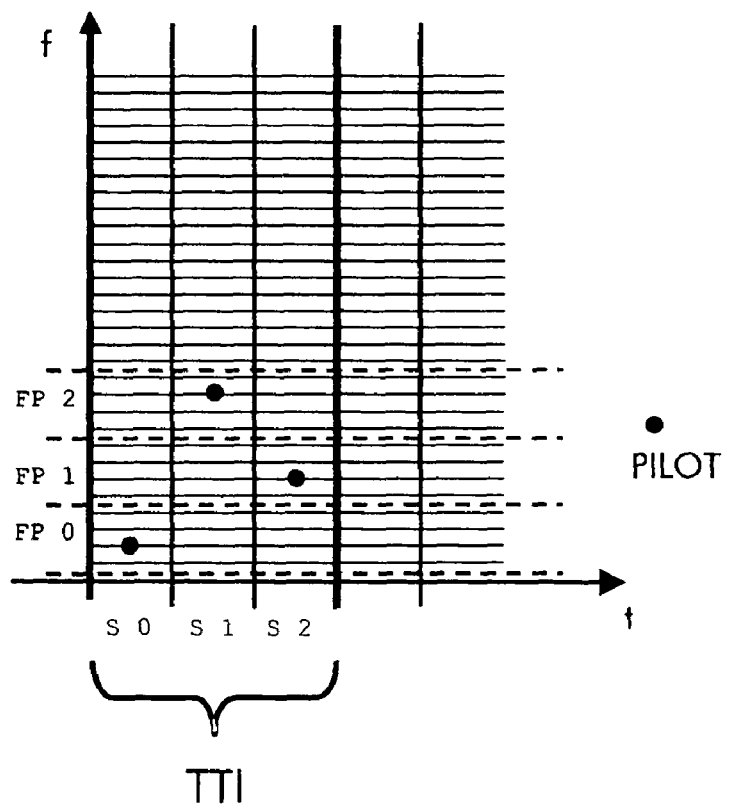
FIG. 3 schematically shows the random allocation of pilots to different frequency patterns of an OFDM time-frequency grid used for carrying out a method for OFDM data transmission according to the invention.

In the following, by way of example the method according to the invention is described in detail making reference to FIGS. 1 to 3.

Orthogonal Frequency Division Multiplexing (OFDM) radio systems are currently under discussion in many places, as e.g. in 3GPP Technical Specification Group (TSG) Radio Access Network (RAN1). This radio system should be a single frequency network as Wideband Code Division Multiple Access (WCDMA) currently is.

Figure 1:
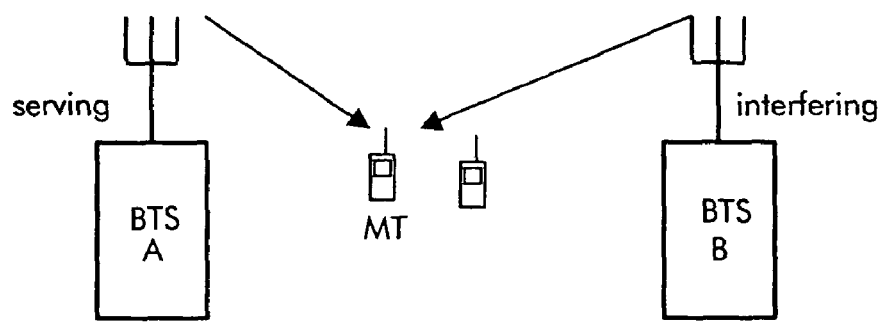
FIG. 1 schematically shows the interference situation at the cell boarder of a mobile terminal MT, which is served by the base transceiver station BTS A and disturbed by the interferences of the base transceiver station BTS B.

In a single frequency OFDM network, regions exist where two cells overlap that are characterized by strong interference by neighbor base transceiver stations, as depicted in FIG. 1. In these regions, channel equalization by means of pilots and the signaling to the mobile terminals MT from both base transceiver stations BTS A and BTS B must be possible.

Usually, the base transceiver stations BTS A and BTS B are not time synchronized. Instead of a solution requiring a cell planning where the pilots are placed on different subcarrier frequencies in neighbor cells, a solution without the need for cell planning is sought for.

In order to allow channel estimation in the interference region of two cells, it is still assumed that pilots and signaling symbols have higher energy than the data symbols which allows channel estimation even if the pilots of the serving cell falls on the same subcarrier frequency as the data symbol of the interfering cell.

A data frame unit also called TTI interval consists of s=12 OFDM symbols in one time interval of e.g. 2 ms. Each OFDM symbol has a number of e.g. 704 useful subcarrier frequencies along the frequency axis. To allow user multiplexing, time-frequency patterns in this TTI interval have to be defined as disjunct subsets of the time-frequency points as shown in FIG. 2. Here, the subcarrier frequencies of the OFDM time-frequency grid are depicted as parallel lines along the frequency axis f, and the positions of the OFDM symbols along the time axis t of a TTI interval numbered 0 to 11 are also depicted as parallel lines. The circles in this OFDM time-frequency grid indicate the pilots and the signaling symbols are indicated by crosses. The subcarrier frequencies inside the dotted rectangle belong to one time-frequency pattern FP allocated to one user.

Though the proposed principle could be applied also for general time-frequency patterns, it is further explained for pure frequency patterns. This is on the one hand done for ease of understanding and on the other hand done since base transceiver stations are usually unsynchronized and interference coordination is usually a goal so that only pure frequency patterns that allocate a subcarrier frequency over the time for all OFDM symbols of a TTI interval can be used.

Now the pilot subgrid is usually a grid of pilot subcarrier frequencies with distance p. In the following, the pilots and signaling symbols are put together and all called pilots for simplification, so that in FIG. 2, the distance p of the pilot subgrid is p=12. If pilot subcarrier frequencies fall on the subcarrier frequencies of a frequency pattern, the respective subcarrier frequencies are stolen from the frequency pattern. Now the frequency patterns have to be defined so that this loss is equally distributed on all frequency patterns for any shift of the pilot subgrid.

Further, different shifts of the pilot subgrid are needed for different cells to allow operation in the interference region which is the task of the invention.

The shift or position of the pilot subgrid can be changed for every OFDM symbol of a TTI interval. So the pilot shift per OFDM symbol defines the pilot pattern, i.e. the set of pilot subcarrier time-frequency locations in a TTI interval of a specific cell, say cell A.

The pilot shift per OFDM symbol for cell B then defines the pilot pattern for cell B. Ideally all pilot subgrids for neighbor cells should not collide i.e. the pilot patterns of neighbor cells should be disjunctive or orthogonal.

The invention is that now the positions of the pilot subgrids of different cells of the mobile network in the OFDM time-frequency grid are randomly or pseudo-randomly distributed.

Since the positions of the pilot subgrids shall be different for each neighbor cell, the pseudo-random sequences of the positions should be either cell specific or time shifted for each cell.

If the pilot subcarrier distance is p there are p-1 shifts of the pilot subgrid possible that do not collide with the pilot subgrid of a neighbor cell. The idea is then that for unsynchronized cells the probability of a collision is as low as about 1/p.

Further it can be tolerated if one collision occurs in one OFDM symbol, if in the OFDM symbol before and after no collision happens. Then the channel estimation can be extrapolated or interpolated from the adjacent OFDM symbols.

This principle also holds true for the signaling information. In the case that shared signaling information is also carried on a grid with higher energy QAM symbols (QAM=Quadrature Amplitude Modulation) similar to or interleaved with the pilot subgrid, such a collision of two cells' grids can be compensated by the redundancy of the channel coding.

In conclusion, isolated collisions of pilots or signaling symbols of adjacent cells can be tolerated.

Now, the probability that two collisions occur one after the other is so low that the block error rate is only insignificantly raised by these events. Since a block error can never be ruled out, there is no principle problem with this technique.

In a preferred embodiment, to ease the reception of signals in the mobile terminals MT, the pseudo random sequence is known to the mobile terminals MT. This can be done e.g. by using shift registers with linear feedback for generation of the pseudo sequences and a periodic signaling of the seed in the cell so that the seed is known at call set up.

The technique described above works for unsynchronized cells and big pilot distance.

In another embodiment, if at least some of the base transceiver stations can be synchronized, for these, the introduction of a cell planning would be possible. In that case, these base transceiver stations would all use the same synchronous random or pseudo-random position of the pilot subgrid plus a cell specific frequency shift. These shifts would be planned to be different in neighbor cells, so that in all interference regions, a collision of the pilot subgrids would never occur. A base station controller according to the invention allocates these same synchronous random or pseudo-random position of the pilot subgrid plus a cell specific frequency shift to cells of the mobile network.

Establishing a general principle with the proposed technique, this means that the single frequency OFDM network would work without demanding synchronization or cell planning, but if synchronization and cell planning is possible, the performance could be somewhat improved.

Figure 2:
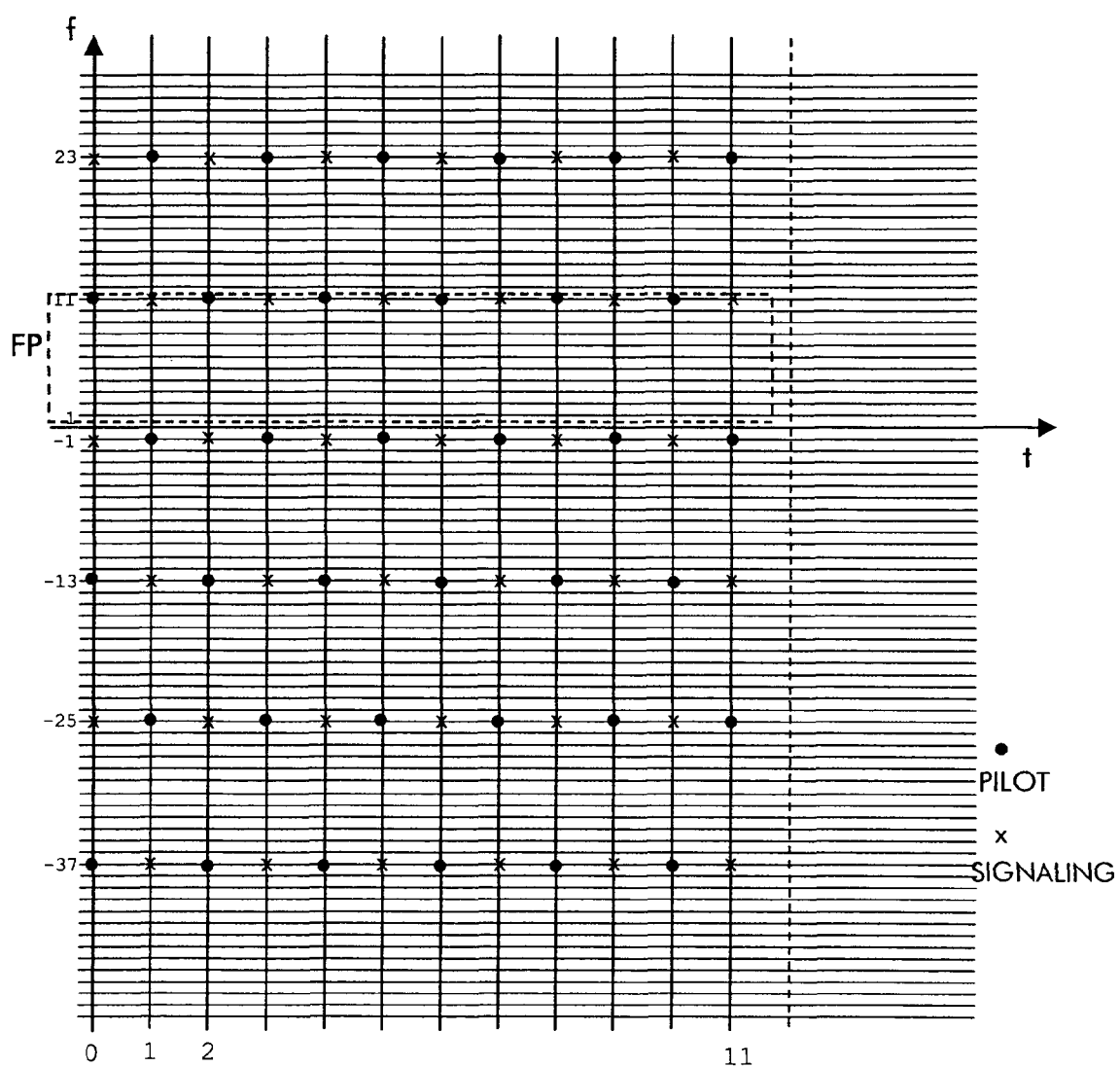
FIG. 2 schematically shows the allocation of the subcarrier frequencies of an OFDM time-frequency grid to pilots and signaling symbols.

To detail the invention, in FIG. 2, there is depicted a pilot subgrid of a pilot distance p=12 and a frequency pattern FP that shall consist of 11 adjacent subcarrier frequencies in 12 consecutive OFDM symbols. Since we have 704 useful subcarrier frequencies available as mentioned above and since 64*11=704, there are 64 of these frequency patterns FP available.

Now, due to the pilot hits in each OFDM symbol, one data subcarrier frequency can be stolen, but at least 10 subcarrier frequencies remain. So, a frequency pattern FP always consists of 10*12=120 QAM symbols useable for transmission in a TTI interval with 12 OFDM symbols. This is true independent of the pilot shift, i.e. independent of the selected pilot subgrid for a specific cell which is easy to see.

The depicted example in FIG. 2 is an example for a frequency selective frequency pattern FP. The same properties can also be achieved if instead a frequency diverse frequency pattern FP with 11 subcarrier frequencies is constructed in a comb like fashion. In this case, the subcarrier frequencies of the frequency pattern FP are distributed in such a way, that the position of the subcarrier frequencies modulo 12 sweeps over the whole range from 0 to 11. Regarding the stealing of subcarrier frequencies by pilots in this case, the frequency diverse frequency pattern FP allows achievement of the same properties and illustrates the working of the invention.

In another embodiment, in an endeavor to construct low rate frequency patterns that are used for long term allocation to stationary users, we assume again a pilot distance, i.e. pilot period, of p=12. Further, a TTI interval shall consist of s=3 OFDM symbols. To allow a low rate frequency pattern, a restricted shift of the pilot subgrid from one OFDM symbol to the next is now proposed. A frequency pattern shall consist just of 4 adjacent subcarrier frequencies as depicted in FIG. 3. Here, the allocation of subcarrier frequencies depicted along the frequency axis f to the frequency patterns FP0, FP1 and FP2 are shown. Four adjacent subcarrier frequencies belong to each frequency pattern FP0, FP1 and FP2. Along the time axis t, there is depicted the three OFDM symbols S0, S1 and S2 of one TTI interval. The pilots, that are (pseudo-)randomly distributed with a restricted shift as explained below, are depicted as dots.

The three frequency patterns FP0, FP1 and FP2 have now to be considered together to evaluate the number of pilot hits, as they have together 12 subcarrier frequencies and as the pilot distance is p=12. Now the pilot shift or pilot position in the first OFDM symbol S0 is not restricted. But in the second OFDM symbol S1, the same frequency pattern FP0 shall not be hit again, so that only 8 pilot shifts or pilot positions remain possible in the frequency patterns FP1 and FP2. Finally, in the third OFDM symbol S2, the two frequency patterns FP0 and FP2 may not be hit anymore, so that only 4 pilot shifts or pilot positions remain possible and the pilot must lie in the frequency pattern FP2.

This restriction of shifts now guarantees, that each frequency pattern FP0, FP1 and FP2 is just subject to one pilot hit in each TTI interval and that 4*3−1=11 subcarriers can be used in each frequency pattern for data transmission. Assuming QPSK modulation (QPSK=Quadrature Phase Shift Keying) for a TTI interval of 0.5 ms, this would still result in a raw data rate of (11*2 bit)/(0.5 ms)=44 kbit/s.

Generally, this restriction of pilot positions can also only be performed in one or several OFDM symbols, and pilots are for these OFDM symbols only allowed in one of these frequency patterns, that have the lowest number of pilots in the current TTI interval.

It is clear that this restriction has influence on the probability that two pilot subgrids from two neighbor cells collide in a random assignment which influences the block error rate (BLER). Further, one has to remember that the two cells are unsynchronized. For multi cell scenarios with high block error rate, the result is expected to be tolerable. Further, following the given principles, the embodiment can also be modified to result in desired values of collision probability.

A base transceiver station according to the invention restricts the (pseudo-)randomly distributed positions of the pilots according to the above mentioned method.

The invention claimed is:

1. A method for OFDM data transmission in a single-frequency multi-cell mobile network from and to mobile terminals, comprising:
   performing channel estimation using pilots of a pilot subgrid in an OFDM time-frequency grid; and
   randomly or pseudo-randomly distributing the positions of the pilot subgrids of different cells of the single-frequency mobile network;
   wherein for several adjacent frequency patterns of the OFDM time-frequency grid occupying a frequency range not larger than the period of the pilot subgrid, for at least one OFDM symbol of a transmission time interval (TTI), the pilots are only allowed in one of these frequency patterns, that has the lowest number of pilots in the current TTI.

2. The method according to claim 1, wherein, if at least two base transceiver stations of the mobile network are synchronized, in the cells corresponding to these at least two base transceiver stations, the same synchronous random or pseudo-random position of the pilot subgrid is used with a cell specific frequency shift.

3. A base transceiver station comprising:
   means for data transmission in a single-frequency multi-cell mobile network from and to mobile terminals with channel estimation by means of pilots of a pilot subgrid in an OFDM time-frequency grid; and
   means for signaling to the mobile terminals information about a pseudo-random position of the pilot subgrid;
   wherein the positions of the pilot subgrids of different cells of the mobile network are randomly or pseudo-randomly distributed; and
   wherein for several adjacent frequency patterns of the OFDM time-frequency grid occupying a frequency range not larger than the period of the pilot subgrid, for at least one OFDM symbol of a transmission time interval (TTI), the pilots are only allowed in one of the frequency patterns, that has the lowest number of pilots in the current TTI.

4. The base transceiver station according to claim 3, wherein, if at least two base transceiver stations of the mobile network are synchronized, in the cells corresponding to these at least two base transceiver stations, the same synchronous random or pseudo-random position of the pilot subgrid is employed in each cell, with a cell-specific frequency shift.

5. A base station controller for radio resource management in a single-frequency multi-cell mobile network, wherein the base station controller comprises:
   means for allocating pilot subgrids to cells of the single-frequency mobile network with randomly or pseudo-randomly distributed positions of these pilot subgrids in an OFDM time-frequency grid of the mobile network; and
   means for allocating the same synchronous random or pseudo-random position of the pilot subgrid plus a cell specific frequency shift to cells of the mobile network;
   wherein for several adjacent frequency patterns of the OFDM time-frequency grid occupying a frequency range not larger than the period of the pilot subgrid, for at least one OFDM symbol of a transmission time interval (TTI), the pilots are only allowed in one of these frequency patterns, that has the lowest number of pilots in the current TTI.

6. The base station controller according to claim 5, wherein, if at least two base transceiver stations of the mobile network are synchronized, in the cells corresponding to these at least two base transceiver stations, the same synchronous random or pseudo-random position of the pilot subgrid is used with a cell specific frequency shift.

7. A mobile terminal for OFDM data transmission in a single-frequency multi-cell mobile network, wherein the mobile terminal comprises:
   means for receiving information over the single frequency mobile network about the pseudo-random position of the pilot subgrid; and
   wherein for several adjacent frequency patterns of the OFDM time-frequency grid occupying a frequency range not larger than the period of the pilot subgrid, for at least one OFDM symbol of a transmission time interval (TTI), the pilots are only allowed in one of these frequency patterns, that has the lowest number of pilots in the current TTI.

8. The mobile terminal according to claim 7, wherein, if at least two base transceiver stations of the mobile network are synchronized, in the cells corresponding to these at least two base transceiver stations, the same synchronous random or pseudo-random position of the pilot subgrid is used with a cell specific frequency shift.

9. A single-frequency multi-cell mobile network comprising mobile terminals, and at least one base transceiver station comprising:
   means for data transmission in a single-frequency multi-cell mobile network from and to mobile terminals with channel estimation by means of pilots of a pilot subgrid in an OFDM time-frequency grid, wherein the positions of the pilot subgrids of different cells of the mobile network are randomly or pseudo-randomly distributed; and
   at least one base station controller for radio resource management in a single-frequency multi-cell mobile network, wherein the base station controller comprises means for allocating pilot subgrids to cells of the mobile network with randomly or pseudo-randomly distributed positions of these pilot subgrids in an OFDM time-frequency grid of the mobile network;
   wherein for several adjacent frequency patterns of the OFDM time-frequency grid occupying a frequency range not larger than the period of the pilot subgrid, for at least one OFDM symbol of a transmission time interval (TTI), the pilots are only allowed in one of these frequency patterns, that has the lowest number of pilots in the current TTI.

10. The single-frequency multi-cell mobile network according to claim 9, wherein, if at least two base transceiver stations of the mobile network are synchronized, in the cells corresponding to these at least two base transceiver stations, the same synchronous random or pseudo-random position of the pilot subgrid is used with a cell specific frequency shift.

* * * * *